UNITED STATES PATENT OFFICE.

WALTER A. JACOBS, OF MOUNT VERNON, AND WADE H. BROWN, MICHAEL HEIDELBERGER, AND LOUISE PEARCE, OF NEW YORK, N. Y., ASSIGNORS TO THE ROCKEFELLER INSTITUTE FOR MEDICAL RESEARCH, OF NEW YORK, N. Y., A CORPORATION OF NEW YORK.

ARSENICAL COMPOUND.

1,280,125.　　　　　Specification of Letters Patent.　　Patented Sept. 24, 1918.

No Drawing. Original application filed October 3, 1917, Serial No. 194,460. Divided and this application filed January 16, 1918. Serial No. 212,117.

*To all whom it may concern:*

Be it known that we, WALTER A. JACOBS, Ph. D., residing at Mount Vernon, Westchester county, New York, WADE H. BROWN, M. D., residing at Flushing, in the city of New York, borough of Queens, Queens county, New York, MICHAEL HEIDELBERGER, Ph. D., residing in the city of New York, borough of Manhattan, county and State of New York, and LOUISE PEARCE, M. D., residing in the city of New York, borough of Manhattan, county and State of New York, all citizens of the United States, have jointly invented a new and Improved Arsenical Compound, of which the following is a specification, this being a division of our application, Serial No. 194,460, filed October 3, 1917.

In the course of our researches and tests on the new type of arsenical compounds of use in the treatment of trypanosomal or spirochætal infections which we describe in our co-pending applications, Serial Nos. 194,459 and 194,461, and which are composed of an aromatic arsonic acid possessing an α-amino-acylamin side chain having the general formula NH.CHR.CONR′R″, in which R may be alkyl or aryl or hydrogen, and R′ and R″ may be alkyl or hydrogen, the aromatic nucleus being joined to the α-amino group in said side chain, we have found that in certain instances, particularly in the treatment of spirochætal infections, improvement in therapeutic power was obtained when the amid or $CONH_2$ group was changed to the ureid or $CONHCONH_2$ group or substituted ureid $CONHCONH.R$ group, in which R may be an alkyl or aryl which may carry an attached substituent.

The substances were obtained by reacting the aminophenylarsonic acid or its homologues or isomers with α-halogenacyl ureas or α-halogenacyl-β-alkylureas, or α-halogenacyl-β-arylureas, alkyl meaning methyl, ethyl, and the like, aryl meaning phenyl, substituted phenyl, benzyl or substituted benzyl and the like. As these substances are arsonic acids they dissolve readily in equivalent amounts of alkali or alkali carbonates or ammonia to form neutral and stable salts.

In particular our researches have demonstrated the value of the two substances designated as N-phenylglycin-ureid-p-arsonic acid with the following formula:

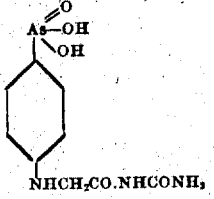

and N-phenylglycin-β-methylureid-p-arsonic acid with the following formula:

These substances and the others to be described below represent a new type of arsenical compounds. The method of preparation is described as follows:

*Example 1—N - Phenylglycineureid - p - arsonic acid.*

217 grams of p-aminophenylarsonic acid dissolved in one liter of normal sodium hydroxid solution or in an aqueous solution or suspension of any other suitable basic substance, are mixed with 135 gm. chloroacetylurea and the mixture boiled for one-quarter of an hour, after which a heavy crop of the crystalline product separates. The mixture is then heated for three-quarters of an hour on the water bath. After cooling, the mixture is treated with hydrochloric acid until the reaction is distinctly acid to Kongo red. The mixture is then filtered off and the residue washed well with water. For purification the product is suspended in one-half a liter of water and sodium hydroxid added until solution is complete. The reaction of the solution should be neutral to litmus. The solution is then filtered and treated with an excess of acetic acid, which precipitates the desired arsonic acid in pure form as microscopic needles. This is filtered, washed and dried.

This arsonic acid is almost insoluble in water but is readily soluble in alkali and alkali carbonates. Its solutions give a precipitate with the heavy metal salts. Boiling acids and alkalis hydrolyze it to phenylglycinarsonic acid. It darkens above 230° C. but does not melt below 280° C. It forms stable salts. The soluble metallic salts and particularly the sodium salt are most convenient for use.

The sodium salt is prepared in the following manner:

The acid is suspended in a small volume of warm water and carefully treated with 25 per cent. sodium hydroxid solution until solution is just complete. It is advisable to make the solution neutral to litmus. An equal volume of saturated aqeous sodium acetate is then added, causing the separation of the crystalline sodium salt. This is filtered off and purified by recrystallization, from a small volume of hot water. The salt thus obtained contains 2 molecules of water of crystallization and dissolves readily in water.

*Example II—N-Phenylglycin-β-methylureid-p-arsonic acid.*

217 grams p-aminophenylarsonic acid are dissolved in one liter of normal sodium hydroxid solution. 155 gm. α-chloroacetyl-β-methylurea are added and the mixture boiled for one hour. The chloro compound gradually dissolves and during the reaction, the reaction product suddenly crystallizes out.

After cooling, the mixture is treated with an excess of concentrated hydrochloric acid and filtered. The product, after washing, is purified as in Example I.

The N-phenylglycin-β-methylureid-p-arsonic acid is a colorless crystalline substance, practically insoluble in cold water, somewhat soluble on boiling, easily soluble in alkali or alkali corbonate, the neutral solutions being stable. It is precipitated by acids from its solutions and by heavy metal salts, as insoluble salts. It decomposes at 232-3° C.

The sodium salt can be obtained as in Example I. It is a stable, colorless crystalline substance which dissolves readily in water and is recommended for use.

*Example III—N-(Phenyl-p-arsonic acid)-α-phenylglycinureid.*

43.4 grams p-aminophenylarsonic acid are dissolved in 200 cc. of normal sodium hydroxid solution and treated with 50 gm. phenyl - chloracetyl - urea ($C_6H_5CHCl.CO.NHCONH_2$) 40 gm. sodium iodid, and 200 cc. alcohol. The mixture is boiled under a reflux for several hours. On cooling the crystalline reaction product possessing the following formula

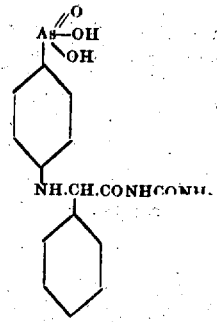

is obtained. This is purified by redissolving it in dilute alkali carbonate or ammonia and then reprecipitating it with acetic acid. It forms microscopic needles. The sodium salt is prepared as described in Example I.

The foregoing are a few examples of substances falling within the spirit and scope of our invention. It will be obvious to anyone skilled in the art that many variations in the exact constitution of the substances described may be made without departing from the spirit and scope of our invention.

What we claim is:

1. As a new product, a soluble salt of an aromatic arsonic acid having in its molecule an α-aminoacylurea side chain, the aromatic nucleus being joined to the α-amino group in said side chain.

2. As a new product, a soluble salt of an aromatic arsonic acid having in its molecule an α-aminoacylurea side chain having the general formula —NH.CHR.CONHCONR'H, in which R is an alkyl or aryl or hydrogen and R' is alkyl, aryl or hydrogen, the aromatic nucleus being joined to the α-amino group in said side chain.

3. As a new product, a soluble salt of an aromatic arsonic acid having in its molecule an α-aminoacylurea side chain having the general formula —NHCH₂CONHCONHR', in which R' is hydrogen or alkyl or aryl.

4. As a new product, a soluble salt of an N-phenylglycin-β-methylureid-arsonic acid.

5. As a new product, a soluble salt of N - phenylglycin - β - methylureid - p - arsonic acid.

6. As a new product, the sodium salt of an aromatic arsonic acid having in its molecule an α-aminoacylurea side chain, the aromatic nucleus being joined to the α-amino group in said side chain.

7. As a new product, the sodium salt of an aromatic arsonic acid having in its molecule an α-aminoacylurea side chain having the general formula —NH.CHR.CONHCONR'H, in which R is an alkyl or aryl or hydrogen and R' is alkyl, aryl or hydrogen, the aromatic nucleus being joined to the α-amino group in said side chain.

8. As a new product, the sodium salt of an aromatic arsonic acid having in its molecule an α-aminoacylurea side chain having the general formula —NHCH₂CONHCONHR', in which R' is hydrogen or alkyl or aryl.

9. As a new product, the sodium salt of an N - phenylglycin - β-methylureid - arsonic acid.

10. As a new product, the sodium salt of N - phenylglycin - β -methylureid - p - arsonic acid.

WALTER A. JACOBS, Ph. D.
WADE H. BROWN, M. D.
MICHAEL HEIDELBERGER, Ph. D.
LOUISE PEARCE, M. D.